No. 863,334. PATENTED AUG. 13, 1907.
W. H. VIBBER.
ELECTRIC INSTALLATION PIPE CAP.
APPLICATION FILED MAY 3, 1907.
2 SHEETS—SHEET 2.
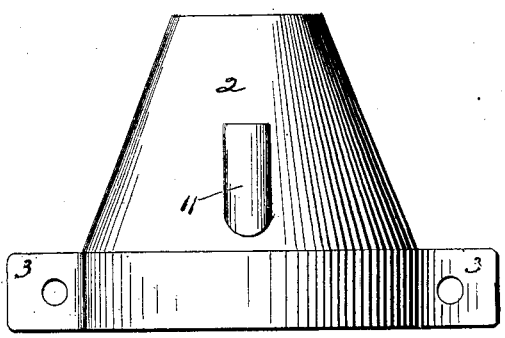
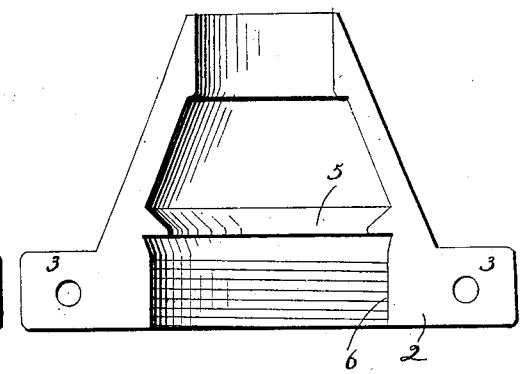
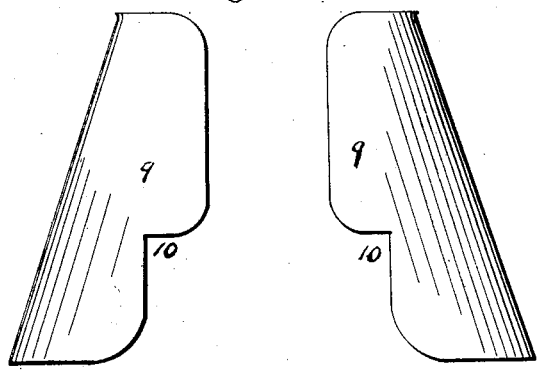
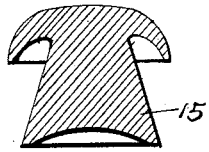
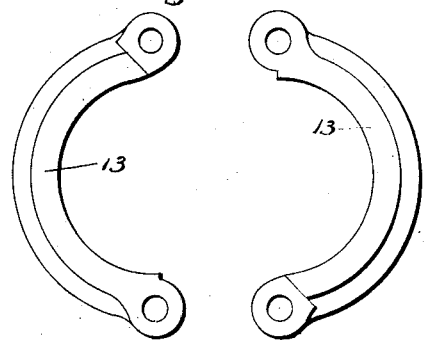

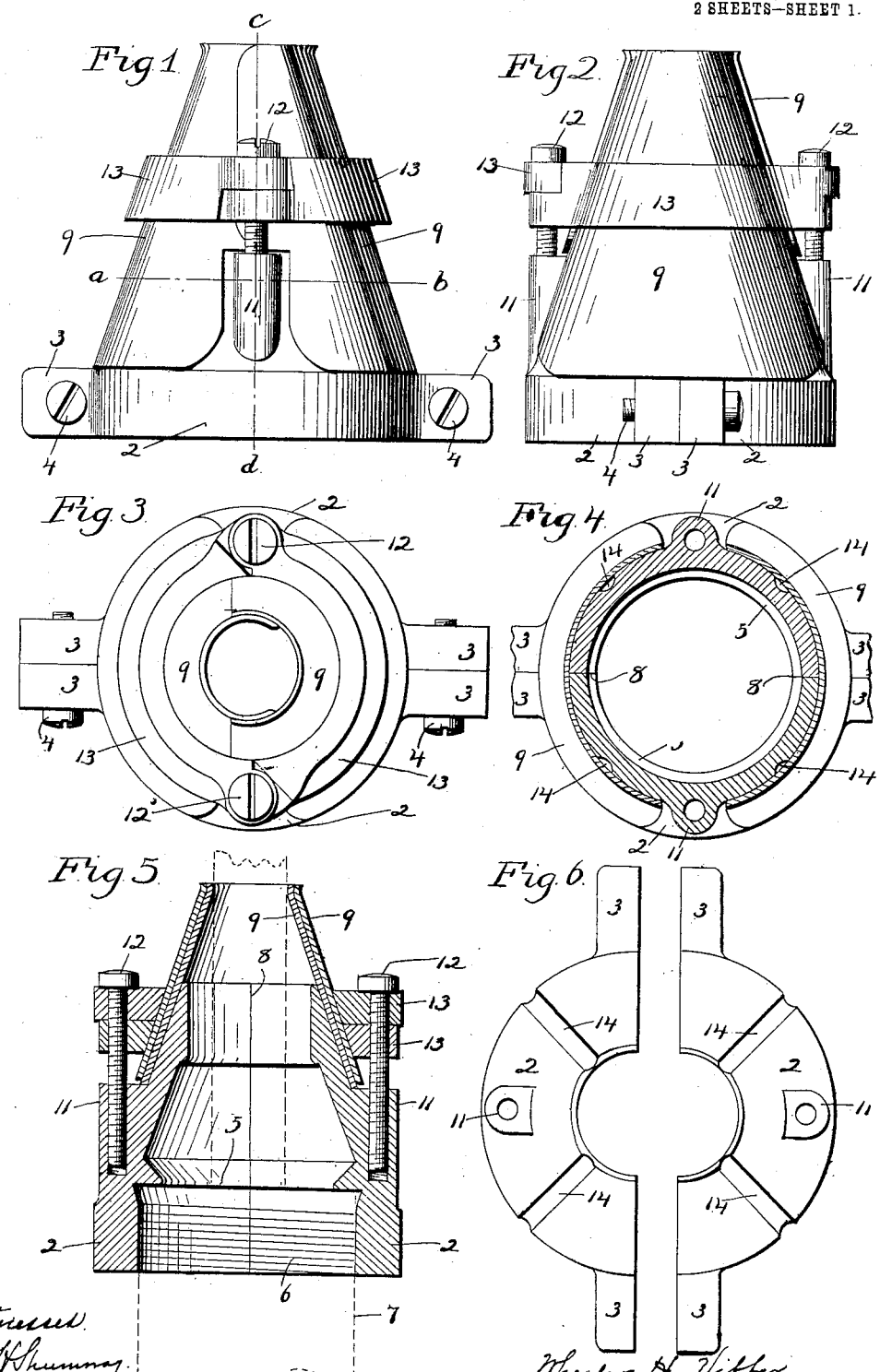

UNITED STATES PATENT OFFICE.

WHEELER H. VIBBER, OF NEW LONDON, CONNECTICUT.

ELECTRIC-INSTALLATION PIPE-CAP.

No. 863,334.  Specification of Letters Patent.  Patented Aug. 13, 1907.

Application filed May 3, 1907. Serial No. 371,693.

*To all whom it may concern:*

Be it known that I, WHEELER H. VIBBER, a citizen of the United States, residing at New London, in the county of New London and State of Connecticut, have invented a new and useful Improvement in Electric-Installation Pipe-Caps; and I do hereby declare the following, when taken in connection with the accompanying drawings and the letters of reference marked thereon, to be a full, clear, and exact description of the same, and which said drawings constitute part of this specification, and represent, in—

Figure 1 a view in side elevation of my improved electric installation pipe-cap. Fig. 2 a view thereof in elevation looking at the same as turned a quarter turn from the position shown in Fig. 1. Fig. 3 a plan view thereof. Fig. 4 a view thereof in horizontal section on the line $a$—$b$ of Fig. 1. Fig. 5 a view thereof in vertical section on the line $c$—$d$ of Fig. 1. Fig. 6 a detached plan view of the two half-cones shown slightly separated from each other. Fig. 7 a detached view in side elevation of one of the half-cones. Fig. 8 a view thereof in inside elevation. Fig. 9 a detached view in side elevation of the two joint-closing aprons shown as separated from each other. Fig. 10 a detached view of the two apron-clips shown as separated from each other. Fig. 11 a view in inside elevation of one of the said clips. Fig. 12 a view in side elevation of the temporary stopper or plug.

My invention relates to an improvement in electric installation pipe-caps, the object being to provide a simple and effective pipe-closure for use in situations where it is either impracticable or undesirable to bend a cable at the point of its issuance from the upper end of the pipe from which the weather must be excluded.

With these ends in view my invention consists in a pipe-cap having certain details of construction and combinations of parts as will be hereinafter described and pointed out in the claims.

In carrying out my invention as herein shown, I employ two half cones 2, 2, each the duplicate of the other and each provided with a pair of oppositely located lugs 3 for the reception of clamping screws 4 by means of which the half-cones are secured together after they have been applied to the pipe on which they have the effect of a one-piece cone. Each of the half-cones 2 is formed with an internal semi-circular supporting-rib 5 which rests upon the top of the pipe and with an internally threaded depending flange 6 for gripping the pipe which is represented by broken lines 7 in Fig. 5. These flanges 6 are a trifle less than semi-circular so that when their edges are brought together they form an oval as shown in Fig. 4, this construction being resorted to to insure the gripping of the pipe in case it is also threaded.

In order to cover the two joints 8 formed by the union of the two half-cones 2, 2, I employ two cone-like joint-closing aprons 9, 9, each the duplicate of the other and each having each of its lower edges cut away to form a clearance-notch 10 for the clearance of the two lugs 11, 11, respectively formed upon the outer faces of the half-cones 2, 2, for the reception of two screws 12, 12, passing downward through the perforated ends of a pair of segmental apron clips 13 which are applied over the aprons 9 so as to draw them together and bind them firmly upon the half-cones 2, 2, the edges of the aprons being in this way overlapped as clearly shown in Figs. 1 and 5. These aprons effectually close the joints 8, 8, but to provide for the discharge of any moisture that might work in at the top of the aprons, I preferably form each cone with two vertical discharging grooves 14. The aprons will, of course, accommodate themselves to cables varying in diameter. If desired the cable may be wrapped with tape at the point where it issues from the aprons before they are applied to the half-cones, whereby any moisture is prevented from working into the cap around the cable, and this tape may be itself protected by wrapping tape around the upper ends of the aprons and the cable after the aprons are applied. Of course any packing material of suitable character may replace the tapes above suggested.

To prevent moisture from entering the cap in case it is applied to the pipe before the cable is drawn through the same, I may provide each cap with a dummy stopper or plug 15 which is discarded when the cable is drawn through the pipe.

It is apparent that in carrying out my invention I may resort to some changes from the construction herein shown and described, to which I do not limit myself.

I claim:—

1. In an electric installation pipe-cap, the combination with two half-cones adapted to be clamped upon the upper end of a pipe, and means for covering the joints between the two half-cones.

2. In an electric installation pipe-cap, the combination with two half-cones adapted to be applied to the upper end of a pipe, of two conical aprons for application to the cones to cover the joints between the same, and means for holding the said aprons in place.

3. In an electric installation pipe-cap, the combination with two half-cones adapted to be applied to the upper end of a pipe, of aprons for covering the joints between the two cones, and clips adapted to be applied over the said aprons and secured to the said cones for binding the aprons in place.

4. In an electric installation pipe-cap, the combination with a cone adapted to be applied to the upper end of a pipe, of an apron applied to the exterior face of the cone and fitted to the cable at the point the same emerges therefrom, and means for securing the said apron in place.

In testimony whereof, I have signed this specification in the presence of two subscribing witnesses.

WHEELER H. VIBBER.

Witnesses:
THOMAS J. LUSK,
N. J. NAHASS.